H. N. DALTON.
Revolving Harrows.

No. 155,226.

Patented Sept. 22, 1874.

WITNESSES:

INVENTOR:
H. N. Dalton
BY
ATTORNEYS.

UNITED STATES PATENT OFFICE.

HENRY N. DALTON, OF PACHECO, CALIFORNIA.

IMPROVEMENT IN REVOLVING HARROWS.

Specification forming part of Letters Patent No. 155,226, dated September 22, 1874; application filed May 9, 1874.

*To all whom it may concern:*

Figure 1:
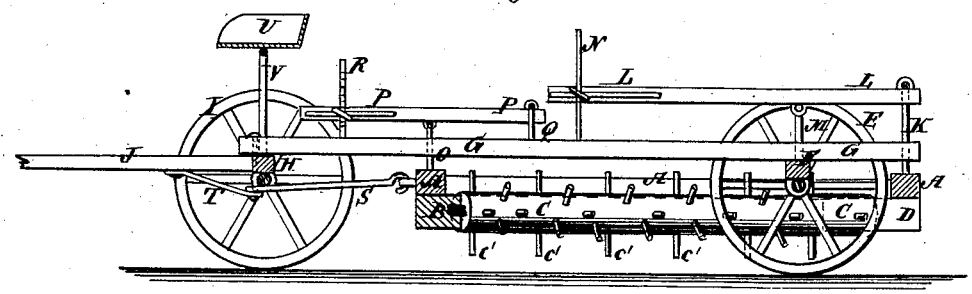
Figure 2:
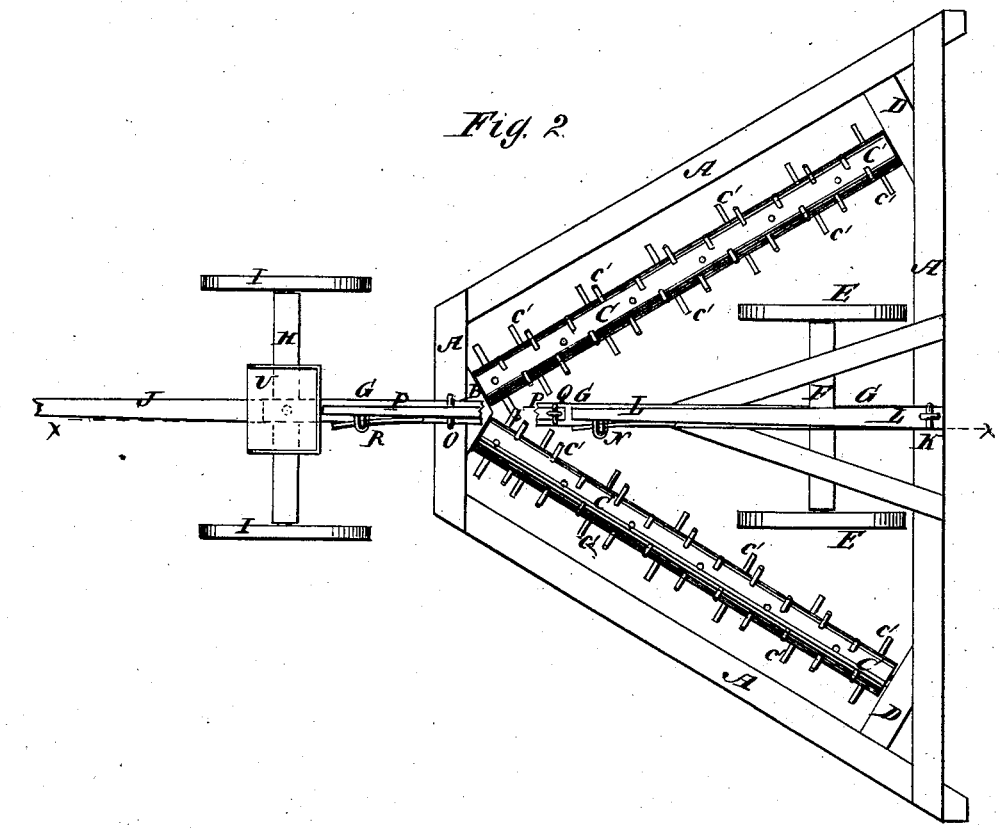

Be it known that I, HENRY N. DALTON, of Pacheco, in the county of Contra Costa and State of California, have invented a new and useful Improvement in Revolving Harrow, of which the following is a specification:

Figure 1 is a vertical longitudinal section of my improved harrow. Fig. 2 is a top view of the same, part being broken away to show the construction.

Similar letters of reference indicate corresponding parts.

The invention will first be fully described, and then pointed out in the claim.

A is the frame of the harrow, which is made in the shape of an isosceles triangle with its forward angle cut off. To the center of the forward cross-bar of the frame A is attached a small triangular block, B, to the sides of which are pivoted the forward ends of two rollers, C, the rear ends of which are pivoted to short cross-bars D, attached to the frame A near its rear angles. To the rollers C are attached numerous pins or teeth, C'. The forward ends of the rollers C are geared to each other by rows of pins, as shown in Fig. 2, or by bevel-gear wheels. The latter construction is preferred, as making the rollers revolve more uniformly.

By this construction, as the harrow is drawn forward the one roller will be revolved by the revolution of the other roller, so that they will stir the soil evenly.

E are the rear wheels of the truck, upon which the harrow is mounted. F is the rear axle, to which is attached the rear part of a long reach, G, the forward end of which is connected to the forward axle H by a king-bolt. I are the forward wheels, and J is the tongue, which is rigidly attached to the forward axle H. To the center of the rear cross-bar of the harrow-frame A is attached a standard, K, to the upper end of which is pivoted the rear end of a lever, L. The lever L is pivoted to the upper end of a standard, M, attached to the rear axle F, and its forward part moves up and down along a notched bar, N, and is provided with a keeper to keep it close to the bar N, and a spring-catch to catch upon said bar. To the center of the forward cross-bar of the frame A is attached a standard, O, to the upper end of which is pivoted a lever, P, the rear end of which is pivoted to a standard, Q, attached to the reach G. The forward part of the lever P moves up and down along a notched bar, R, and is provided with a keeper to keep it close to the bar R, and a spring-catch to catch upon said bar.

By this construction the levers L P enable the harrow to be adjusted to work at any desired depth in the ground, or to be raised away from the ground for convenience in passing from place to place.

The harrow is drawn by the rod S, the rear end of which is pivoted to the center of the forward cross-bar of the frame A, and its forward end is placed upon the lower end of the king-bolt, which is strengthened against the draft-strain by a brace, T, attached to the tongue J.

U is the driver's seat, the standard V of which is attached to the forward axle H.

Having thus described my invention, I claim as new and desire to secure by Letters Patent—

The described combination, with wheeled frame, of two rolls, C C, provided with teeth C', arranged convergingly toward the front, and turning by frictional contact with the soil, for the purpose specified.

H. N. DALTON.

Witnesses:
TURNER BROWNRIGG,
BARRY BALDWIN.